United States Patent [19]
Chabardes et al.

[11] 3,925,485
[45] Dec. 9, 1975

[54] PROCESS FOR THE PREPARATION OF ALLYLIC ALCOHOLS

[75] Inventors: Pierre Chabardes; Charles Grard, both of Lyon; Charles Schneider, Vernaison, all of France

[73] Assignee: Rhone-Poulenc S.A., Paris, France

[22] Filed: Sept. 7, 1972

[21] Appl. No.: 286,889

Related U.S. Application Data

[63] Continuation of Ser. No. 888,934, Dec. 29, 1969, abandoned.

[52] U.S. Cl...... 260/617 R; 260/473 R; 260/484 R; 260/488 R; 260/561 R; 260/584 C; 260/584 R; 260/609 R; 260/612 D; 260/612 R; 260/613 D; 260/618 R; 260/619 A; 260/619 R; 260/631.5; 260/632; 260/642 R

[51] Int. Cl.² ............... C07C 33/02; C07C 69/61; C07C 41/00

[58] Field of Search.... 260/631, 632, 617 R, 642 R, 260/631.5, 473 R, 484 R, 488 R, 561 R, 584 C, 584 R, 609 R, 612 R, 613 D, 618 R, 619 A, 619 R

[56] References Cited
OTHER PUBLICATIONS

Simonsen, "The Terpenes," Vol. 1, pp. 63–65, (1963).

Moeller, "Inorganic Chemistry," pp. 326, 327, 334 and 335, Wiley, N.Y., (1968).

*Primary Examiner*—R. Gallagher
*Assistant Examiner*—D. B. Springer
*Attorney, Agent, or Firm*—Cushman, Darby and Cushman

[57] ABSTRACT

Allylic primary and secondary alcohols are prepared by rearranging allylic tertiary alcohols in the presence of a catalyst comprising a metal of group Va, VIa or VIIa of the Periodic Table of Mendeleev.

8 Claims, No Drawings

PROCESS FOR THE PREPARATION OF ALLYLIC ALCOHOLS

This is a continuation, of application Ser. No. 888,934, filed 12-29-69, now abandoned.

The present invention provides a process for the preparation of allylic primary or secondary alcohols from allylic tertiary alcohols, The acid-catalysed rearrangement of allyl alcohols, especially allylic tertiary alcohols, is well known; see, for example, Braude, Quarterly Rev. 4, 407–417 (1950). This rearrangement is commonly known as an allylic rearrangement.

The use of liquid phase acidic media for the rearrangement of allyl alcohols suffers from various disadvantages on an industrial scale; in particular:

a. the separation of the reaction products generally requires the reaction medium to be neutralised; the result of this neutralisation is, on the one hand, the loss of the catalysing acid and, on the other hand, the formation in the reaction medium of a large amount of a salt of the catalysing acid;

b. the reaction medium is corrosive in character; and c. reaction by-products, resulting from hydration or the addition of acid to the double bonds of the reagents and reaction products, are formed.

The rearrangement of allylic tertiary alcohols by a two-stage process in which the first stage consists in an acetylative rearrangement using acetic anhydride and the second consists in a saponification is also known; see for example, Dimroth Ber. 71, 1340 (1938).

A process for the single-stage catalytic rearrangement of allylic tertiary alcohols to allylic primary or secondary alcohols, which does not suffer from the above-mentioned disadvantages has now been discovered, and forms the subject of the present invention.

According to the present invention, there is provided a process for the preparation of allylic primary or secondary alcohols which comprises heating an allylic tertiary alcohol containing the >C(OH)-CH-CH-CH- residue in the liquid phase in the presence of a catalyst comprising a metal from groups Va, VIa or VIIa of the Periodic Table according to Mendeleev.

The tertiary allylic alcohols which may be rearranged in accordance with the present invention have the formula:

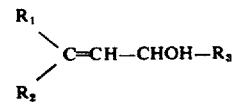

in which $R_1$ and $R_2$ either:

a. are identical or different and represent aliphatic or cycloaliphatic, saturated or unsaturated radicals, aromatic radicals or araliphatic radicals, optionally substituted by halogen, hydroxy, alkoxy, acyl or acyloxy, and optionally having their carbon chain interrupted by hetero-atoms, such as O, N or S, or functional groups, such as —CO— or —CO—NH—; or b. taken together form a single divalent, saturated or unsaturated aliphatic radical of 2 or more carbon atoms optionally substituted by alkyl, cycloalkyl, aryl, aralkyl, hydroxy, alkoxy, acyl, acyloxy or halogen, and optionally having their carbon chain interrupted by hetero-atoms, such as O, N or S or functional groups such as —CO—, —CO—NH— or cycloalkylene or arylene radical;

and $R_3$ represents hydrogen or has the same significance as that given for $R_1$ or $R_2$.

A class of alcohol which is particularly useful in the process of the invention consists of the alcohols in which $R_3$ represents a hydrogen atom.

Preferably $R_1$, $R_2$ and $R_3$ contain 2 to 30 carbon atoms in toto and at least one of the radicals $R_1$ and $R_2$ is a saturated or unsaturated, substituted or unsubstituted aliphatic radical containing 1 to 15 carbon atoms, or 2 to 15 where unsaturation occurs.

Suitably, $R_1$ and $R_2$ are identical or different and represent a saturated or unsaturated aliphatic radical containing from 1 to 11 carbon atoms or together form a single divalent aliphatic radical containing 5 or 6 ring carbon atoms, optionally containing one ethylenic double bond and optionally being substituted by one or more alkyl groups of 1 to 5 carbon atoms; and $R_3$ represents hydrogen or an alkyl group of 1 to 5 carbon atoms.

The allylic primary or secondary alcohols prepared by rearrangement of the allylic tertiary alcohol according to the invention are generally of the formula:

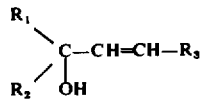

in which $R_1$, $R_2$ and $R_3$ have the same significance as above.

However, where $R_1$ and $R_2$ together form a divalent radical such as an optionally substituted pentamethylene radical, $\alpha\beta$-ethylenic alcohol with an intracyclic double bond is, for example, also formed.

The catalysts which may be used in the process of the invention comprise derivatives of transition metals of groups Va, VIa or VIIa, preferably derivatives of metals chosen from vanadium, niobium, molybdenum, tungsten or rhenium.

The following derivatives may suitably be used: halides, chalcogenides, chalcohalides, nitrosochlorides and nitrosylhalides; salts of inorganic oxo-acids such as sulphates, nitrates, phosphates, carbonates, arsonates, arsenates, germanates, perchlorates, sulphites and nitrites; mixed salts of the transition metals of groups Va, VIa or VIIa with other metals; salts of aliphatic, cycloaliphatic or aromatic acids or alcohols; or of phenols, such as acetates, propionates, stearates, benzoates, oxalates, succinates, sulphonates, tartrates, citrates, salicylates and naphthenates, alkoxides and phenates. These salts may also be those containing oxygen-containing metal cations, such as vanadyl and molybdenyl.

Further derivatives which may be used include: salts and esters of acids derived from one or more of these metals, such as the vanadates, niobates, tantalates, molybdates, tungstates or rhenates; per-, poly-, ortho-, meta-, pyro-, thio- or halogeno- analogues thereof; mixed salts and mixed esters, such as tungstovanadates, phosphomolybdates, tartratoniobates, zirconitungstates, molybdocitrates, -formates, -lactates, -maleates, -mandelates, -mucates, -oxalates, -quinates, -saccharates, -tartrates and -tungstates.

The following complex derivatives are also suitable: chelates such as acetylacetonates, benzoylacetonates, glyoximates, quinolinates, salicylaldehydates and benzylhydroxamates, derivatives of ethylenediamine, α,α'-dipyridyl, o-nitrosophenol, β-nitrosonaphthol, salicylaldimidine and porphyrins, which ligands may optionally be substituted by, for example, aliphatic or cycloaliphatic groups or by halogen atoms. It is also possible to use the complexes of the metals or metal salts with coordination agents, such as carbon monoxide, monoolefines, diolefines and polyolefines, acetylenic compounds, cyclopentadienyl, ammonia, cyanides, tertiary nitrogen-containing bases, phosphines, arsines, stibines and nitriles; organometallic compounds, such as the metal alkyls may also be used.

A class of catalysts which is particularly suitable for carrying out the invention consists of the products containing a chain having one of the following formulae:

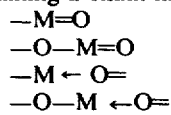

in which M represents a metal atom of groups Va, VIa or VIIa which may furthermore be bonded to other atoms by one or more ionic or covalent bonds. This class of catalysts includes metal oxides, salts and esters of oxy-acids derived from metals, salts of oxygen-containing metal ions, and chelates such as those derived from β-diketones.

The active metal derivative which constitutes the catalyst may be deposited on a carrier. As carriers which may be used, the following may be quoted: activated alumina and silica, pumice, fuller's earth, diatomaceous earth, and active charcoal.

The amount of metal present in the catalyst is usually greater than 0.0001% and preferably between 0.05 and 2%, relative to the weight of the reaction mixture. Greater amounts of catalysts can naturally be used but without major additional advantage.

The catalyst may be soluble or insoluble in the reaction medium. Finally, it may be mixed with small amounts of a co-catalyst or activator. As a co-catalyst, the following may be quoted without implying a limitation: alcohols, Lewis bases, such as ammonia, amines, phosphines, arsines, stibines and bismuthines, and compounds which can liberate a Lewis base under the reaction conditions, such as ammonium salts. An excess of co-catalyst is sometimes harmful as regards obtaining good yields. The optimum amount of co-catalyst varies depending both on the nature of this co-catalyst and of the catalyst.

The process may be carried out in the presence or absence of a solvent. Compounds which are chemically inert towards the catalyst and the reagents are usually employed as the solvent. Chlorinated or unchlorinated aliphatic, alicyclic or aromatic hydrocarbons, ethers and amides are particularly suitable.

Where a sufficiently volatile allylic alcohol is rearranged in solution, this alcohol may be introduced in the vapour phase into the liquid reaction medium heated to the appropriate reaction temperature, the said liquid medium initially containing principally solvent and catalyst. In order to keep the temperature constant, a distillation may be carried out at the rate at which the reaction products are formed.

The reaction temperatures are generally between 50° and 250°C., preferably between 100° and 200°C. The pressure is not a critical factor in the process of the invention and atmospheric pressure is generally used.

Where the catalyst employed is an ester of an oxy-acid derived from a metal of groups Va, VIa and VIIa it is advantageous to carry out the process in an anhydrous atmosphere to avoid hydrolysing the catalyst.

The process of the invention may be carried out continuously or discontinuously. At the end of the reaction the catalyst and the unreacted tertiary alcohol may, in general, be recovered and re-used for fresh rearrangement processes. The allylic primary or secondary alcohol prepared according to the present invention may be isolated in a manner known per se, for example by fractional distillation through a sufficiently efficient column. By "manner known per se" is meant herein any method previously used or disclosed in the literature.

The allylic alcohols prepared according to the present invention are important intermediates in organic syntheses, particularly in the syntheses of natural products especially those of the terpene series. They are also useful in perfumery compositions.

The following Examples illustrate the invention. Unless otherwise stated, the yields indicated are the yields of allylic primary or secondary alcohol obtained, calculated relative to the tertiary alcohol converted during the reaction; and the degree of conversion is equal to the ratio of the amount of tertiary alcohol converted during the reaction to the amount of tertiary alcohol initially employed.

EXAMPLE 1

100 g. of linalol (3,7-dimethyl-1,6-octadien-3-ol) and 4 g. of ammonium metavanadate (a product sold commercially by Prolabo) were introduced into a 150 cm3 flask equipped with a stirrer, a reflux condenser, a dropping funnel and a dip tube.

Nitrogen was bubbled through the reaction mixture at the rate of 2 l/hour so as to remove the greater part of the ammonia formed during the reaction. The mixture was heated for 6 hours at 150°C, cooled and filtered through a sintered glass filter. The flask and the sintered glass filter were rinsed twice with 25 cm3 of diethyl ether at a time. The filtrate was concentrated so as to evaporate the ether. 99.7 g. of a crude product were obtained and this was distilled under 0.1 mm. of mercury, using a Vigreux column 200 mm. high and 25 mm. in diameter. Between 60° and 100°C a total of 32.2 g. of a mixture containing 16.2 g. geraniol was collected, with the fraction distilling between 70° and 75°C. (12.7 g.) containing 98% by weight of geraniol.

Degree of conversion: 28.5 %. Yield : 57 %.

EXAMPLE 2

20 g. of linalol and 0.8 g. of ammonium metavanadate were introduced into a 50 cm³ flask equipped as in Example 1.

Nitrogen was bubbled through the reaction mixture as in Example 1; the mixture was then heated at 130°C. for 5 hours 30 minutes followed by 1 hour 20 minutes at 150°C. The reaction mixture was cooled and distilled under 0.2 mm. of mercury.

18.9 g. of a mixture containing 5.3 g. of geranoil were collected between 48° and 115°C.

Degree of conversion : 43.7 %. Yield : 60.5 %.

EXAMPLE 3

5 g. of nerolidol (3,7,11-trimethyl-1,6,10-dodecatrien-3-ol) and 0.2 g. of ammonium metavanadate were introduced into a 50 cm³ flask equipped with a stirrer, a reflux condenser and a dropping funnel.

The mixture was heated at 150°C. for 1 hour 50 minutes, cooled and distilled under 0.1 mm. of mercury. Between 70° and 115°C, 4.83 g. of a fraction containing 1.26 g. of farnesol (3,7,11-trimethyl-2,6,10-dodecatrien-1-ol) were collected.

Degree of conversion : 32 %. Yield : 78.5 %

EXAMPLE 4

Preparation of the catalyst:

Tertiary butyl orthovanadate were prepared from tertiary butanol and $V_2O_5$ according to the method described by N. F. Orlov and M. G. Voronkov (Izv. Akad. Nauk, SSSR, Otdel. Khim, Nauk, 933–4 (1959)).

Rearrangement:

5 g. of nerolidol, 0.2 g. of tertiary butyl orthovanadate and 1 cm³ of tertiary butanol were introduced into a 50 cm³ flask equipped with a stirrer, a dropping funnel and a reflux condenser.

The mixture was heated for 2 hours at about 125°C. in an anhydrous atmosphere, cooled and distilled under 0.3 mm. of mercury. Between 78° and 112°C, 4.77 g. of a fraction containing 0.7 g. of farnesol was collected.

Degree of conversion : 18.6 %. Yield : 75 %.

EXAMPLE 5

Preparation of the catalyst:

Tertiary amyl orthovanadate was prepared from tertiary amyl alcohol and $V_2O_5$ in accordance with the method mentioned in Example 4.

Rearrangement:

5 g. of nerolidol and 0.5 g. of neopentyl orthovanadate was introduced into an apparatus identical to that of Example 3, and heated for 2 hours at 120°C in an anhydrous atmosphere.

The reaction medium was cooled and poured into a separating funnel, into which 50 cm³ of water and 40 cm³ of diethyl ether were added. After shaking and decanting, the organic layer was separated and 50 cm³ of water and 40 cm³ of diethyl ether were again added thereto. The mixture was decanted and the organic layer was separated off, dried over $Na_2SO_4$, filtered, concentrated and distilled under 0.1 mm. of mercury. 3.42 g. of a mixture containing 0.89 g. of farnesol were collected between 90° and 115°C.

Degree of conversion : 24.6 %. Yield : 72.5 %.

EXAMPLE 6

20 g. of nerolidol and 0.6 g. of tertiary butyl orthovanadate prepared as in Example 4 were introduced into an apparatus identical to that of Example 3.

The mixture was heated for 20 minutes at 150°C in an anhydrous atmosphere, cooled and distilled under 0.05 mm. of mercury. 19.27 g. of a mixture containing 3.54 g. of farnesol were collected between 75° and 120°C.

Degree of conversion : 28 %. Yield : 63.5 %.

EXAMPLE 7

5 g. of nerolidol, 0.1 g. of ammonium molybdate and 1 cm³ of cyclohexanol were introduced into an apparatus identical to that of Example 2.

Nitrogen was bubbled into the reaction medium at the rate of 2 l/hour so as to remove the greated part of the ammonia formed during the rearrangement.

The mixture was heated at 130°C. for 2 hours 50 minutes, cooled and distilled under 0.2 mm. of mercury. 3.92 g. of a fraction containing 0.76 g. of farnesol were collected between 100° and 120°C.

Degree of conversion : 29 %. Yield : 52.5 %.

EXAMPLE 8

Preparation of the catalyst:

Cyclohexyl orthovanadate was prepared from ammonium metavanadate and cyclohexanol according to the method described by F. Carton and N. Caughlan [J. Physic. Chem. 64, 1756 (1960)]. The reagents were heated to the reflux temperature of cyclohexanol, water and ammonia being removed at the rate at which they are formed. The reaction mixture was cooled and filtered. The cyclohexanol was removed by distillation of the filtrate under reduced pressure and the cyclohexyl ester was collected as the distillation residue.

Rearrangement:

5 g. of nerolidol and 0.5 g. of cyclohexyl orthovanadate were introduced into an apparatus identical to that of Example 3.

The mixture was heated for 20 minutes at 130°C in an anhydrous atmosphere, cooled and distilled under 0.15 mm. of mercury. 4.9 g. of a fraction containing 0.76 g. of farnesol were collected between 85° and 115°C.

Degree of conversion : 34.2%. Yield : 44.5%.

EXAMPLE 9

Preparation of the catalyst:

15 cm³ of an ammoniacal solution (containing 20% of $NH_3$) were run into a mixture of 11.3 g. of $VOSO_4/3.5\ H_2O$, 100 cm³ of distilled water and 11.3 cm³ of acetylacetone, with stirring. The resulting solution had a pH of 9. The mixture was stirred for one hour at ambient temperature and filtered. The precipitate was washed with 100 cm³ of distilled water and dried to constant weight; vanadyl acetylacetonate $VO(C_5H_7O_2)_2$ was obtained.

Rearrangement:

Example 8 was repeated, replacing the cyclohexyl orthovanadate by vanadyl acetylacetonate and heating for 2 hours in place of 20 minutes. On distillation under 0.15 mm. of mercury, 4.01 g. of a mixture containing 0.22 g. of farnesol were collected between 70° and 118°C.

Degree of conversion : 19.8 %. Yield : 22.2 %.

EXAMPLE 10

5 g. of 3-methyl-1-penten-3-ol and 0.2 g. of cyclohexyl orthovanadate prepared as in Example 8 were introduced into an apparatus identical to that of Example 3.

The mixture was heated under reflux in an anhydrous atmosphere for 5 hours 5 minutes; during the course of this the temperature of the reaction medium rose from 78° to 132°C. The mixture was cooled and distilled under 15 mm. of mercury. 4.79 g. of a fraction containing 0.17 g. of 3-methyl-2-penten-1-ol were collected between 40° and 60°C.

Degree of conversion : 18.6 %. Yield : 76.3 %.

EXAMPLE 11

3 g. of 2-methyl-3-nonen-2-ol and 0.12 g. of ammonium metavanadate were introduced into an apparatus identical to that of Example 2.

Nitrogen was bubbled through at the rate of 2 l/hour so as to remove the greater part of the ammonia formed during the rearrangement.

The mixture was heated at 130°C. for 2 hours 50 minutes, cooled and distilled under 0.01 mm. of mercury. 2.58 g. of a fraction boiling at between 35° and 63°C. and containing 0.38 g. of 2-methyl-2-nonen-4-ol were collected.

Degree of conversion : 27 %. Yield : 47 %.

EXAMPLE 12

4.5 g. of 2,2,6-trimethyl-1-vinylcyclohexanol and 0.2 g. of ammonium metavanadate (commercial product) were introduced into an apparatus identical to that of Example 2.

Nitrogen was bubbled into the reaction medium at the rate of 2 l/hour so as to remove the greater part of the ammonia formed during the reaction.

The mixture was heated at 150°C for 5 hours, cooled and filtered. The flask and the filter were rinsed with two portions of 20 cm³ of diethyl ether. The product was concentrated. On distillation under 0.1 mm. of mercury, 4.16 g. of a fraction containing 0.34 g. of 1-(2-hydroxyethyl)-2,6,6-trimethyl-cyclohexene were collected between 40° and 70°C.

Degree of conversion : 17.3 %. Yield : 43.5 %.

EXAMPLE 13

Preparation of the catalyst (tetrahydrolinalyl orthovanadate):

10 g. of ammonium metavanadate and 100 cm³ of 3,7-dimethyl-3-octanol were introduced into a 250 cm³ flask equipped with a stirrer, a dip tube and a reflux head.

Nitrogen was bubbled into the medium at the rate of 6 l/hour. The mixture was heated for 2 hours at 150°C, with water and ammonia being removed at the rate at which they were formed.

The mixture was diluted with 100 cm³ of cyclohexane, 1 g. of active vegetable charcoal was added, and the whole heated under reflux for one hour and filtered. The cyclohexane and excess dimethyloctanol were removed by distilling the filtrate. The residue was further heated for 30 minutes at 100°C. under 0.2 mm. of mercury.

45.9 g. of pure tetrahydrolinalyl orthovanadate, of formula:

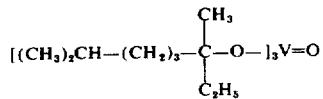

were thus obtained as a distillation residue.

Rearrangement:

20 g. of linalol, 0.538 g. of catalyst and 0.149 g. of triethanolamine were introduced into an apparatus identical to that of Example 3.

The mixture was heated in an anhydrous atmosphere at 150°C for 1 hour 30 minutes and then at 160°C for 1 hour 50 minutes, cooled and distilled under 0.3 mm. of mercury.

Between 47°C. and 60°C, 19.52 g. of a fraction containing 3g. of geraniol were collected.

Degree of conversion : 23.4 %. Yield : 64 %.

EXAMPLE 14

200 g. of linalol and 2.70 g. of tetrahydrolinolyl orthovanadate prepared as in Example 13 were introduced into a 500 cm³ flask fitted with a stirrer and a reflux condenser.

The mixture was heated for 2 hours at 161°C. under a nitrogen atmosphere, and was cooled. On distillation, under a reduced pressure of 0.2 mm. Hg, 191 g. of a fraction containing 38.7 g. of geraniol were collected between 45° and 78°C.

Degree of conversion : 25.2 %. Yield : 76.9 %.

EXAMPLE 15

150 g. of nerolidol and 2.025 g. of tetrahydrolinalyl orthovanadate prepared as in Example 13 were introduced into an apparatus identical to that of Example 13.

The mixture was heated for 1 hour at 160°C. and under a nitrogen atmosphere, cooled and distilled in the presence of triethanolamine under a pressure reduced to 0.25 mm. of mercury. Between 90° and 108°C, 148.5 g. of a fraction containing 29.3 g. of farnesol were collected.

Degree of conversion : 21.7 %. Yield : 89.9 %.

EXAMPLE 16

18.8 g. of 3-methyl-1-buten-3-ol and 0.2 of tetrahydrolinalyl orthovanadate prepared as in Example 13 were introduced into a 125 cm³ stainless steel autoclave in a nitrogen atmosphere.

The mixture was heated for 7 hours at 150°C under autogenous pressure, cooled and distilled under a pressure reduced to 112 mm. of mercury. 3-Methyl-2-buten-1-ol was obtained with a degree of conversion of 25.6 % and a yield of 83 %.

We claim:

1. A process for the preparation of allylic primary or secondary alcohols of the formulae:

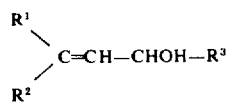

and the tautomers thereof, comprising the step of heating in the liquid phase an ethylenic tertiary alcohol of the formulae:

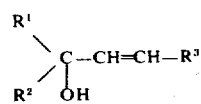

in the presence of a transition metal catalyst selected from the group consisting of compounds of vanadium, niobium molybdenum, tungsten and rhenium, and wherein $R^1$ and $R^2$ are selected from the group consisting of alkyl, non-conjugated alkenyl and alkadienyl, cyclo-alkyl of 3 – 10 carbons, carbocyclic arylakyl and carbocyclic aromatic groups, and wherein $R^1$ and $R^2$ together may represent an alkylene or alkenylene of 4 to 7 carbons in the starting material, and together form a 1-cycloalkenylene of 5 to 8 carbons in the alcohol product, and wherein $R^1$ and $R^2$ may be substituted by halogen, hydroxy, alkoxy, alkanoyl or alkanoyloxy, and $R^3$ may be the same as $R^1$ and $R^2$, individually, or hydrogen.

2. The process according to claim 1 in which the allylic tertiary alcohol is selected from the group consisting of linalol, nerolidol, 3-methyl-1-penten-3-ol, 2-methyl-3-nonen-2-ol, 2,2,6-trimethyl-1-vinylcyclohexanol, and 3-methyl-1-buten-3-ol.

3. The process according to claim 1 in which the catalyst is selected from the group consisting of ammonium metavanadate, tert-butyl orthovanadate, tert-amyl orthovanadate, ammonium molybdate, cyclohexyl orthovanadate, vanadyl acetylacetonate and tetrahydrolinalyl orthovanadate.

4. The process according to claim 1 in which the catalyst is deposited on a carrier which is activated alumina, activated silica, pumice, fullers earth, diatomaceous earth or active charcoal.

5. The process according to claim 1 wherein the catalyst is an ester of an oxyacid derived from said metal.

6. The process according to claim 1 wherein $R_1$ represents an alkenyl or alkadienyl radical of 2-15 carbon atoms, $R_2$ represents an alkyl radical and $R_3$ represents hydrogen, $R_1$, $R_2$ and $R_3$ together containing up to 30 carbon atoms and wherein the catalyst is a derivative of vanadium.

7. The process according to claim 1 in which the reaction mixture contains a co-catalyst selected from the group consisting of alcohols, Lewis bases, amines, phosphines, arsines, stibines, bismuthines and ammonium salts.

8. The process according to claim 1 in which the reaction mixture contains an inert solvent.

* * * * *

UNITED STATES PATENT OFFICE
CERTIFICATE OF CORRECTION

Patent No. 3,925,485          Dated December 9, 1975

Inventor(s) Pierre Chabardes; Charles Grard; Charles Schneider

It is certified that error appears in the above-identified patent and that said Letters Patent are hereby corrected as shown below:

In the heading:

Please add

--[30]   Foreign Application Priority Data
        Dec. 30, 1968     France.....181,946

Column 1, line 42, correct formula to read

-- >C(OH)-CH=CH- --

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*